(12) United States Patent
Schmitt

(10) Patent No.: US 6,745,623 B2
(45) Date of Patent: *Jun. 8, 2004

(54) METHOD AND SYSTEM FOR IDENTIFYING A TYRE OF A VEHICLE

(75) Inventor: Hubert Schmitt, Ochtendung (DE)

(73) Assignee: Lucas Varity GmbH (DE)

( * ) Notice: Subject to any disclaimer, the term of this patent is extended or adjusted under 35 U.S.C. 154(b) by 86 days.

This patent is subject to a terminal disclaimer.

(21) Appl. No.: 10/134,028

(22) Filed: Apr. 25, 2002

(65) Prior Publication Data

US 2003/0000296 A1 Jan. 2, 2003

Related U.S. Application Data

(63) Continuation of application No. PCT/EP00/10180, filed on Oct. 16, 2000.

(30) Foreign Application Priority Data

Oct. 25, 1999 (DE) .......................................... 199 51 273

(51) Int. Cl.$^7$ ................................................. G06F 7/00
(52) U.S. Cl. ............................ 73/146; 73/146.2; 701/1; 701/69; 340/442; 200/61.22
(58) Field of Search ................ 73/146, 146.2; 340/442, 443, 444, 445; 701/1

(56) References Cited

U.S. PATENT DOCUMENTS

| | | |
|---|---|---|
| 4,909,074 A | 3/1990 | Gerresheim et al. |
| 5,297,424 A | 3/1994 | Sackett |
| 5,828,975 A | 10/1998 | Isshiki et al. |
| 5,880,363 A | 3/1999 | Meyer et al. |
| 5,965,808 A | 10/1999 | Normann et al. |
| 6,182,021 B1 * | 1/2001 | Izumi et al. ................. 702/138 |
| 6,404,330 B1 * | 6/2002 | Sugisawa ..................... 340/444 |
| 6,604,026 B2 * | 8/2003 | Schmitt ............................ 701/1 |

FOREIGN PATENT DOCUMENTS

| | | |
|---|---|---|
| DE | 4106848 | 9/1991 |
| DE | 19632150 | 2/1998 |
| DE | 19744611 | 4/1999 |
| EP | 466535 | 1/1992 |
| EP | 481043 | 9/1994 |
| EP | 712740 | 5/1996 |

OTHER PUBLICATIONS

Document Bibliography and Abstract for DE4106848 from esp@cent database, http://l2.espacenet.com/espacenet/viewer?PN=DE4106848&CY=ep&LG=en&DB=EPD.
Document Bibliography and Abstract for DE19744611 from esp@cent database, http://l2.espacenet.com/espacenet/abstract?CY=ep&LG=en&PNP=DE19744611&DB=DE.

* cited by examiner

Primary Examiner—Edward Lefkowitz
Assistant Examiner—Andre Allen
(74) Attorney, Agent, or Firm—MacMillan, Sobanski & Todd, LLC

(57) ABSTRACT

The invention concerns a method and a system for identifying tires of a vehicle, tire pressures of the tires of the vehicle being measured and analysed for the driving-dynamic states of the vehicle with the use of parameters which indicate the driving-dynamic states. Individual tires of the vehicle are unambiguously identified on the basis of the analysis of the measured tire pressures or their variations.

17 Claims, 1 Drawing Sheet

METHOD AND SYSTEM FOR IDENTIFYING A TYRE OF A VEHICLE

CROSS REFERENCE TO RELATED APPLICATIONS

This application is a continuation of International Application No. PCT/EP00/10180 filed Oct. 16, 2000, which claims priority to German Patent Application No. 19951273.6 filed Oct. 25, 1999, the disclosures of which are incorporated herein by reference.

BACKGROUND OF THE INVENTION

The invention concerns a method and a system for measuring and processing driving-dynamic parameters of a vehicle. In particular, the invention concerns a method and a system for identifying a tyre of a vehicle by using the tyre pressures of the tyres to be identified.

Known systems for monitoring tyre pressures of different tyres of a vehicle comprise pressure sensor elements which are normally mounted on the rims and are surrounded by the corresponding tyres, or are mounted on the insides of the tyres, or are integrated into the tyres or the valve. The pressure sensor elements are respectively connected to a transmitter by which both the signals/data indicating the measured tyre pressures and an identification (ID information) which is characteristic of the corresponding pressure sensor elements are transmitted to a receiver. The receiver evaluates both the signals/data indicating the tyre pressures and the characteristic identifications.

Since the receiver does not obtain or receive any information in respect of which characteristic identification and which tyre pressure signals belong to which tyre, it is necessary to calibrate the tyre pressure monitoring system in such a way that the receiver can assign the information obtained from the transmitters to the corresponding pressure sensor elements.

Only on the basis of these assignments can the receiver and/or a control/monitoring unit connected to it provide information on which tyre pressure is present in which tyre and assign any drop in pressure to the corresponding tyre. Even in the event of a failure or malfunction of a pressure sensor element, the defective pressure sensor element can be identified in this way.

This calibration operation (which is also termed the learn mode) must be performed both when the wheel or tyre is first fitted on a factory-new vehicle and upon each subsequent wheel, tyre or valve change, since it cannot be ensured that, following changing, the wheels or the tyres are mounted according to the previous assignment.

The calibration operation is normally performed with the use of transponders which are integrated into corresponding sensor circuits of the sensor elements. Each of the transponders is individually activated, in a defined sequence, to transmit data, so that the characteristic identifications and the transmitted pressure information can be unambiguously assigned to the corresponding pressure sensor elements. In the case of a passenger car with four wheels and one spare wheel each having one tyre, the sequence for activating the individual transponders of the tyres can be defined as follows:

left front tyre—right front tyre—left rear tyre—right rear tyre—spare wheel tyre.

This procedure for identifying individual tyres of a vehicle and for assigning to the corresponding tyres sensor information which is measured at the corresponding tyres and transmitted to a receiver has various disadvantages. The recalibration of such tyre pressure monitoring systems is time-consuming and requires additional facilities for activating the transponders assigned to the individual pressure sensor elements. These facilities for activating the transponders are generally only available to the various specialist vehicle firms. For this reason, in order to ensure faultless functioning of the tyre pressure monitoring system, a tyre change should not be performed without recourse to a specialist vehicle firm, i.e., a tyre change performed by the driver/owner themselves. If, nevertheless, a tyre change is performed without recourse to a specialist vehicle firm, i.e., if it is performed privately or if no calibration operation is performed when a tyre is changed, faultless functioning of the tyre pressure monitoring system is no longer assured. Moreover, malfunctions of the tyre pressure monitoring system can occur if, for example, the tyre pressure monitoring system can no longer be provided with the current assignment. This can occur, for example, if a memory in which the current assignment is stored is inadvertently/accidentally erased. In such cases, it is necessary to repeat the calibration operation with such tyre pressure monitoring systems, this normally requiring the vehicle to be brought into an appropriate specialist firm. In any case, the operation of the vehicle has to be interrupted, since the recalibration of the tyre pressure monitoring system cannot be performed independently/automatically by the latter and/or during the driving operation of the vehicle.

A method is known from DE 196 32 150 A1 for monitoring the air pressure in the tyres of motor vehicle wheels, in which long-wave units, which are respectively assigned to a tyre and transmit long-wave signals, are used for identifying the individual tyres. The long-wave signals are respectively received by a long-wave receiving unit of a wheel module assigned to a tyre, and are processed to generate a long-wave identification signal. Each of the wheel modules transmits the corresponding long-wave identification signal together with a data signal, which indicates the respective tyre pressure, to a receiving unit located on the vehicle. The positions of the motor vehicle wheels can be unambiguously assigned to the data signals transmitted by the wheel modules on the basis of the long-wave identification signals contained in the data signals. A disadvantage in this case is that, in addition to the components for measuring the tyre pressures, it is necessary for components to be located on the tyres or wheels and on the vehicle for the purpose of transmitting the long-wave signals, as well as generating the long-wave identification signals, embedding them in the data signals and extracting them from the data signals again following their transmission.

Proceeding from this, the invention is intended to provide a method and a system which render possible, without time-consuming and cost-intensive recalibration, unambiguous identification of tyres of a vehicle and unambiguous identification of sensor signals, relating to the corresponding tyres, measured at the tyres. Furthermore, the invention is intended to provide a solution which avoids the need to use additional devices (e.g., transponders, long-wave transmission units) for the calibration operation. In addition, malfunctions of a tyre pressure monitoring system are to be reduced, and corrected in a simple manner.

SUMMARY OF THE INVENTION

To achieve these objects, the invention provides a method according to claim 1 and a system according to claim 12.

In the case of the method, according to the invention, for identifying a tyre of a vehicle, a tyre pressure of a vehicle tyre is measured for at least two different driving-dynamic states of the vehicle and the measured tyre pressures are compared for the purpose of determining a tyre pressure variation on the basis of this comparison. The determined tyre pressure variation is analysed using driving state parameters which are determined by the at least two different driving-dynamic states. The vehicle tyre at which the tyre pressures were measured is identified on the basis of the analysis of the tyre pressure variation.

This procedure is based on the fact that the dynamic tyre circumferences vary in dependence on the respective prevailing driving-dynamic state of the vehicle. This variation of the dynamic tyre circumferences results in a tyre pressure variation in the corresponding tyre. If the tyre pressures of a tyre, or its variations, are determined and if information is available which permits description/definition of the driving-dynamic state of the vehicle causing the tyre pressure variations, the vehicle tyre at which the tyre pressures were measured can be unambiguously identified.

In addition, the measurement and comparison of the tyre pressures can be performed for at least one tyre of at least two different wheels of the vehicle. In this way, several, preferably all, tyres of the vehicle can be identified. Furthermore, it is possible thus to identify several tyres assigned to one wheel of the vehicle. This is the case, for example, in the case of lorries with twin tyres.

In addition, it is possible to measure and compare with one another the tyre pressure of all tyres at which tyre pressures have been measured. Analysis of the tyre pressures can then be performed using information which comprises the previously recorded tyre pressures or tyre pressure variations, reference tables and information used for the application of neural networks or chaos-theory methods. In this way, the identification of the individual tyres of the vehicle can be performed more rapidly and with greater exactness, since not only driving state parameters, but also information resulting from the comparison of the tyre pressures of all wheels is used for analysing the at least one pressure variation. This additional information permits a more accurate description of the driving-dynamic state of the vehicle in which the tyre pressures are determined. Moreover, there is a reduction of the number of different driving-dynamic states of the vehicle in which tyre pressures of the tyres have to be measured in order for individual tyres of the vehicle to be unambiguously identified.

In order to simplify the method according to the invention, the measurement of the tyre pressures can include at least one measurement of the tyre pressures for a predetermined driving-dynamic state of the vehicle. In this case, a tyre pressure is preferably measured, for one, several or all tyres of the vehicle, in a predetermined driving-dynamic state of the vehicle. Such a predetermined/predefined driving-dynamic state of the vehicle can be, for example, straight forward travel of the vehicle at a constant speed or predefined constant acceleration. Furthermore, it is also possible in this case to measure tyre pressures of tyres when the vehicle is operated but not in motion (e.g. when the vehicle is in a parked position and the ignition is switched on or the engine is started).

In addition, the method can also include a measurement of driving state parameters that are determined by driving-dynamic states of the vehicle. In this way, it is no longer necessary for the required driving state parameters to be provided by other components of the vehicle which perform corresponding methods for measuring driving state parameters. The measurement of driving state parameters can also be thus optimised, in that the measurement of the driving state parameters is specially adapted to the identification of tyres.

Driving-dynamic states of the vehicle are preferably determined from the corresponding driving state parameters. This enables information that comprehensively represents the driving-dynamic states of the vehicle to be used in analysis of the tyre pressure variations, without the need to use individual driving state parameters. To determine the driving-dynamic states of the vehicle from the corresponding driving state parameters, it is possible to use known algorithms, reference tables, calculation methods used on neural networks or a fuzzy logic, and data/information, provided in the use of other methods, for determining driving-dynamic states of the vehicle, which are performed by vehicle components specially designed for this purpose.

Furthermore, data can be stored which is used for identifying individual tyres or all tyres of the vehicle. This data for identifying tyres can be used during the operation of the vehicle, so that it is not necessary to repeat performance of the method according to the invention for identifying tyres.

Since it cannot be assured that no tyre change has been performed between a termination and a resumption of operation of the vehicle, it is preferable that the method be performed upon each restarting of the vehicle.

In order that unambiguous identification of tyres is also assured during driving operation of the vehicle in every situation (e.g. in the case of a malfunction of electrical/electronic vehicle components), it is preferable that the method according to the invention be performed at predetermined times or at predetermined intervals of time, i.e., repeatedly, during a driving operation of the vehicle.

An object of the invention is also achieved with a system for identifying a tyre of a vehicle. For this, the system includes a device located at a tyre of a vehicle for the purpose of measuring tyre pressures, and a transmitting device, connected to the device for measuring the tyre pressures, for the purpose of transmitting tyre pressure signals. These tyre pressure signals of the transmitting device are received by a receiver device and transmitted to a processor device which is connected to the receiver device for the purpose of processing the tyre pressure signals. The system according to the invention also includes at least one device for measuring driving state parameters which characterize the driving-dynamic states of the vehicle. The at least one device for measuring the driving state parameters is connected to the processor device for the purpose of transmitting these parameters. The processor device is designed, according to the invention, in such a way that it determines tyre pressure variations for the tyres from the tyre pressure signals and evaluates them, using the driving state parameters, for the purpose of providing data/information which serves to identify the tyre at which the device for measuring the tyre pressure is located.

A device for measuring the corresponding tyre pressures is preferably respectively located at each of at least two tyres which are each respectively assigned to a wheel of the vehicle, each of the devices for measuring the tyre pressures being connected to a corresponding transmitter, and the receiver device being set up to receive pressure signals of all transmitting devices.

The processor device should also be designed so that it determines tyre pressure variations for each tyre at which one of the devices for measuring tyre pressures is located, and evaluates them using the driving state parameters. In this way, it is possible to assign tyre pressure variations to the corresponding tyres, so that each tyre is identified.

The device for measuring tyre pressure variations preferably comprises a pressure sensor.

The at least one device for measuring the driving state parameters should also comprise at least one sensor for measuring driving-dynamic state quantities.

The device for measuring tyre pressures or the transmitting device can also have a characteristic identification which is transmitted to the receiver device by the transmitting device before, after or isochronously with the tyre pressure signals.

In order that the system according to the invention can be used in vehicles with a different number of tyres and/or a different number of devices for measuring tyre pressure variations and corresponding transmitting devices, the receiver device comprises receiving units respectively assigned to a transmitting device for the purpose of receiving signals from the latter. This permits a modular construction of the system according to the invention, which can be adapted to the particular application instance (e.g. vehicle type).

Preferred embodiments of the invention are described in the following, with reference to the appended FIG. 1.

DETAILED DESCRIPTION OF THE INVENTION

Figure 1:
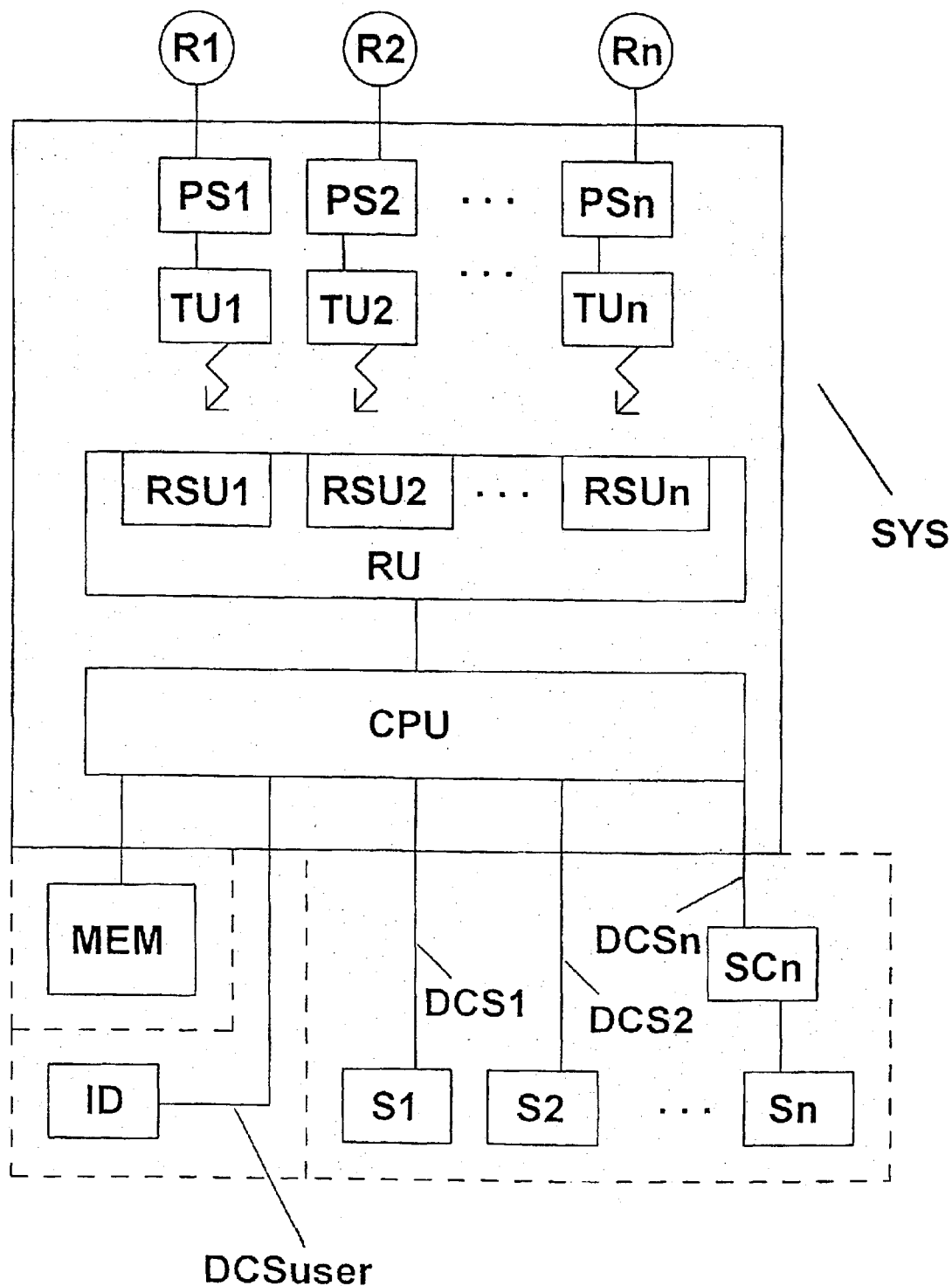
FIG. 1 shows a schematic representation of an embodiment of the invention.

As shown in FIG. 1, the system SYS for identifying a tyre R1, . . . , Rn of a vehicle comprises pressure sensors PS1, . . . , PSn which are respectively assigned to one of the tyres R1, . . . , Rn of the vehicle for the purpose of measuring the corresponding tyre pressure. Each pressure sensor PS1, . . . , PSn is connected to a transmitting device TU1, . . . , TUn for the purpose of transmitting to the transmitting devices TU1, . . . , TUn signals which indicate the respective measured tyre pressure.

Depending on the type of sensor, the tyre pressure signals from the pressure sensors PS1, . . . , PSn can be analog or digital signals. The transmitting devices TU1, . . . , TUn transmit the received tyre pressure signals or corresponding signals to a receiver device RU. The tyre pressure signals are transmitted by wireless transmission from the individual transmitting devices TU1, . . . , TUn to the receiver device. It may therefore be necessary for the transmitting devices TU1, . . . , TUn to convert the tyre pressure signals, prior to their transmission, so that they are suitable for wireless transmission. This is the case, for example, if the pressure sensors PS1, . . . , PSn emit analog signals and the transmitting devices TU1, . . . , TUn require signals in digital form for transmission to the receiver device RU.

In FIG. 1, the pressure sensors PS1, . . . , PSn and the corresponding transmitting devices TU1, . . . , TUn are represented as separate components of the system SYS. It is also possible, however, for the pressure sensors and the corresponding transmitting devices to be arranged as a unit, in order to achieve a smaller constructional design and to simplify the transmission of tyre pressure signals from the pressure sensors to the transmitting devices. In particular, it is advantageous for the pressure sensors and the corresponding transmitting devices to be of an integrated design if the pressure sensors are to be integrated into the corresponding tyres R1, . . . , Rn or the associated rim or valve.

The tyre pressure signals are transmitted by wireless transmission from the transmitting devices TU1, . . . , TUn to the receiver device RU, i.e., without a physical connection between the transmitting devices TU1, . . . , TUn and the receiver device RU. The tyre pressure signals can be transmitted in any known manner, e.g. with the use of high-frequency signals, optical signals or other electromagnetic signals.

In the case of the depicted embodiment, the receiver device RU comprises receiving units RSU1, . . . , RSUn which are respectively assigned to one of the transmitting devices TU1, . . . , TUn.

The use of the receiving units RSU1, . . . , RSUn enables the tyre pressure signals transmitted by the transmitting devices TU1, . . . , TUn to be received isochronously and/or independently of one another.

Alternatively, it is possible to use a receiver device RU which comprises only one receiver for all transmitting devices TU1, . . . , TUn, or receiver units RSU1, . . . , RSUn which are assigned to several transmitting devices TU1, . . . , TUn. In these cases, it is necessary to use appropriate signal transmission methods (e.g. time-multiplex method, frequency-multiplex method) in order to assure faultless signal transmission and faultless receiving of signals.

As shown in FIG. 1, the receiver units RSU1, . . . , RSUn are integrated into the receiver unit RU. Alternatively, it is possible for the receiving units RSU1, . . . , RSUn and the receiver unit RU to be designed as separate components. In this way, it is possible to use one receiver device RU for different applications (tyre number, vehicle type . . . ), the number and type of the receiving units RSU1, . . . , RSUn being adapted to the particular application. Although this modular construction of the receiver device RU and of the receiving units RSU1, . . . , RSUn has a greater resource requirement, it permits a more flexible application of the system SYS for identifying a tyre of the vehicle.

The receiver device RU transmits the received tyre pressure signals to a processor device CPU. Here, again, the received tyre pressure signals can be processed by the receiver device RU and/or the processor device CPU in order to obtain signals, representing the tyre pressures, that are suitable for transmission to the processor device CPU and for being received by the latter.

In addition, it is possible for the receiver device RU and the processor device CPU to be integrated in one component if appropriately connected, separate receiver and processor devices RU, CPU, as shown in FIG. 1, are not used.

In addition to the tyre pressure signals, the processor device receives driving state signals DCS1, . . . , DCSn, $DCS_{user}$. The driving state signals DCS1, . . . , DCSn, $DCS_{user}$ represent driving state parameters which are determined by driving-dynamic states of the vehicle or describe driving-dynamic states of the vehicle.

The driving state signals DCS1, . . . , DCSn, $DCS_{user}$ can be supplied to the processor device CPU in various ways. In the simplest case, the processor device CPU is directly connected to a sensor S1 which is located in the vehicle in such a way that it measures driving state parameters of the vehicle and supplies them to the processor device CPU. Alternatively, or additionally, it is possible for the processor device CPU to be connected to a sensor controller SCn which controls a corresponding, assigned sensor Sn for the purpose of measuring driving state parameters, processes, if necessary, signals which represent the driving state parameters and supplies them to the processor device CPU.

In both cases, the sensors S1, . . . , Sn can be special sensors assigned to the processor device CPU and/or sensors which are received, via common connections (e.g. CAN bus) by other systems (e.g. ABS, ESP, ASR, active chassis damping, electronic vehicle stability systems) which use driving state parameters.

Which sensor types are used for the sensors S1, ..., Sn depends primarily on the particular application (vehicle type, already existing vehicle components), as long as the driving state signals DCS1, ..., DCSn supplied by the sensors S1, ..., Sn represent driving-dynamic states of the vehicle in such a way that an identification of a tyre R1, ..., Rn of the vehicle can be performed by the processor device CPU using these signals. Examples of possible sensor types are sensors for measuring the acceleration of the vehicle, the brake actuation, the accelerator pedal position, the engine rotational speed, the engine torque, the steering wheel position, the tyre/wheel rotational speed, etc.

In addition, it is possible to supply to the processor device CPU driving state signals $DCS_{user}$ which are generated independently of the sensors S1, ..., Sn, under the control of a user (e.g. the driver), with the use of an appropriate input device ID. The use of the driving state signals $DCS_{user}$ enables the system SYS to be used for identifying a tyre of a vehicle even in vehicles in which the use of sensors for measuring driving-dynamic states is not possible or is too costly. This is the case, for example, if a vehicle is to be retrofitted with the system SYS and there are no sensors (yet) available or provided for measurement of driving-dynamic states.

As indicated in FIG. 1 by the broken lines, the system SYS can comprise the sensors S1, ..., Sn, a corresponding sensor controller SCn and/or the input device ID and/or only driving state signals DCS1, ..., DCSn, $DCS_{user}$ of these units.

In addition, the system SYS for identifying a tyre can be connected to a memory device MEM, or can comprise the latter. The memory device MEM contains data which can be accessed by the processor device CPU and which can be stored, at least partially, in the memory device MEM by the processor device CPU. This data comprises both data which is used/required by the processor device CPU for identifying a tyre and data which—following the identification of the tyre(s) R1, ..., Rn—identifies the tyre(s).

The operation of the system SYS for identifying tyres is described in the following using the example of a passenger car with four wheels mounted on the vehicle axles and with one spare wheel, each wheel respectively having one tyre. This description does not limit the invention to its use for such vehicle types, since the invention can be used for any vehicle type which has tyres which are subjected to tyre pressure variations. This includes motorcycles, vehicles with more than four tyres or wheels and vehicles with more than one tyre per wheel (twin tyres).

The tyre pressures of the tyres R1, ..., R5 are measured by means of the pressure sensors PS1, ..., PS5, for a first driving-dynamic state of the vehicle, and transmitted to the receiver device RU by the transmitting devices TU1, ..., TU5. The processor device CPU receives, in addition to the tyre pressure signals from the receiver device RU, the driving state signals DCS1, ..., DCSn, $DCS_{user}$ which indicate the first driving-dynamic state of the vehicle for which the tyre pressures have been measured.

Although it is possible to define each driving-dynamic state of the vehicle as a first driving-dynamic state, a predefined driving-dynamic state should be used in order to simplify the identification of the tyres R1, ..., R5. For example, it is possible to define, as a first driving-dynamic state of the vehicle, the driving-dynamic state in which the vehicle travels straight forward at a constant speed, or is in a parked position (i.e., ignition switched on/engine started, no speed).

Starting from a first driving-dynamic state of the vehicle in which the vehicle travels straight forward at a constant speed, the following information, which is to be understood as exemplary, is supplied to the processor device CPU:

First driving-dynamic state: straight forward travel, speed constant
Pressure of the tyre R1: 1.800 bar
Pressure of the tyre R2: 1.900 bar
Pressure of the tyre R3: 2.000 bar
Pressure of the tyre R4: 1.930 bar
Pressure of the tyre R5: 1.880 bar The pressures of the tyres R1, ..., R5 are then measured for a second driving-dynamic state of the vehicle and supplied to the processor device CPU. In this case, likewise, the processor device CPU receives driving state signals DCS1, ..., DCSn, $DCS_{user}$ which indicate the second driving-dynamic state. As in the case of the first driving-dynamic state, an arbitrary driving-dynamic state of the vehicle, or a predetermined driving-dynamic state of the vehicle, may also be defined for the second driving-dynamic state.

If a predetermined driving-dynamic state is used, the measurement of the corresponding tyre pressures can only be performed when the vehicle has assumed the predetermined second driving-dynamic state. Depending on the definition of the predetermined second driving-dynamic state, this can render the identification of the tyres R1, ..., R5 difficult or impossible, namely, if the vehicle does not assume the predetermined second driving-dynamic state or does so only infrequently.

In the case of a predetermined second driving-dynamic state, therefore, a driving-dynamic state should be selected which is frequently assumed by the vehicle. For example, it is possible to define, as a predetermined second driving-dynamic state of the vehicle, the driving-dynamic state in which the vehicle is accelerated from a standstill to moving off (e.g. in moving off at a traffic signal).

In order for the identification of the tyres R1, ..., R5 of the vehicle to be performed as rapidly as possible (e.g. immediately following startup of the vehicle), the tyre pressures for the second driving-dynamic state of the vehicle are not determined for a predetermined driving-dynamic state, but at a predetermined interval of time from the measurement of the tyre pressures for the first driving-dynamic state. The choice of the predetermined interval of time is determined by the respective application of the invention.

The driving state parameters which represent the corresponding second driving-dynamic state are determined at the instant at which the tyre pressures for a second driving-dynamic state are measured. For example, the second driving-dynamic state of the vehicle can be the state in which the vehicle is at constant speed in a left-hand bend. In this case, the following information is available to the processor device CPU:

Second driving-dynamic state: left-hand bend travel, constant speed
Pressure of the tyre R1: 1.760 bar
Pressure of the tyre R2: 1.860 bar
Pressure of the tyre R3: 2.000 bar
Pressure of the tyre R4: 1.970 bar
Pressure of the tyre R5: 1.920 bar This information shows that the pressures of the tyres R1 and R2 have decreased and the pressures of the tyres R4 and R5 have increased, the pressure of the tyre R3 having remained constant.

The tyres R1 and R2 are thus located on the side of the vehicle nearest the inside of the bend (left side of the vehicle) and the tyres R4 and R5 are located on the side of the vehicle nearest the outside of the bend (right side of the vehicle). Since the tyre R3 has not undergone any pressure variation, the tyre R3 is the spare tyre.

In order to identify the front and rear tyres of the vehicle, it is necessary to determine the pressures of the tyres R1, . . . , R5 for a third driving-dynamic state of the vehicle. As in the case of the second driving-dynamic state, it is possible to measure the tyre pressures for a predetermined third driving-dynamic state or for an arbitrary driving-dynamic state, at a predetermined interval of time from the preceding tyre pressure measurement. The predetermined interval of time in this case can be the same as, or different from, the interval of time between the first and second pressure measurements.

For the reasons stated above, the third tyre pressure measurement is preferably performed for an arbitrary driving-dynamic state, at an interval of time from the second tyre pressure measurement, the intervals of time being the same, for reasons of simplicity. If, in the case of the third tyre pressure measurement, the vehicle is travelling straight forward at a constant positive acceleration, the following information is supplied to the processor device CPU:

Third driving-dynamic state: straight forward travel, constant positive acceleration Pressure of the tyre R1: 1.690 bar
Pressure of the tyre R2: 1.980 bar
Pressure of the tyre R3: 2.000 bar
Pressure of the tyre R4: 1.850 bar
Pressure of the tyre R5: 1.920 bar Since—by comparison with the tyre pressures in the first driving-dynamic state—the tyres R1 and R4 have a decreased tyre pressure and the tyres R2 and R5 have an increased tyre pressure, it is shown that the tyre R1 is the left front tyre, the tyre R2 is the left rear tyre, the tyre R4 is the right front tyre and the tyre R5 is the right rear tyre.

This third tyre pressure measurement for the third driving-dynamic state is not necessary if an unambiguous identification of the tyres R1, . . . , R5 is possible on the basis of the information on the second driving-dynamic state. This is the case, for example, if, instead of the above-mentioned second driving-dynamic state, a driving-dynamic state exists in which the vehicle is at constant acceleration in a left-hand bend.

Irrespective of this, it is possible to measure tyre pressures and corresponding driving state parameters for further driving-dynamic states in order to assure a more reliable identification of the tyres R1, . . . , R5 or to verify an identification of the tyres that has already been performed.

Following completion of identification of the tyres R1, . . . , R5, the processor device CPU generates data/information which represents the identification and transmits it to the memory device MEM. This data in the memory device MEM is then accessed by the processor device CPU and/or other devices of the vehicle (not shown) for the purpose of assigning measured tyre pressure variations (e.g. loss of pressure due to a tyre defect) to the corresponding tyres R1, . . . , R5.

Furthermore, the memory device MEM can contain data/information which is used by the processor device CPU in the identification of the tyres and, in particular, the analysis of the measured tyre pressure variations, using the driving state parameters. Such data/information comprises previously recorded tyre pressures or tyre pressure variations, algorithms for tyre identification or analysis of tyre pressures or tyre pressure variations, reference tables and data/information which is used for the application of neural networks and/or chaos theory methods.

In the case of vehicles which are to be retrofitted with the system SYS for identifying tyres and which do not have sensors for measuring driving-dynamic states, retrofitting with appropriate driving state sensors can be expensive or impossible. In this case it is necessary for the processor device CPU to be provided by other means with data/information which indicates driving states of the vehicle.

A possible solution for this is the use of an input device ID which is preferably located in the interior of the vehicle, more precisely, in the passenger compartment. Under the control of the processor device CPU, driving-dynamic states which are to be assumed are defined by a user (e.g. the driver) by means of the input device ID. As soon as the vehicle, under the control of the user, has assumed a predefined driving-dynamic state, this is confirmed by the user by the use of the input device ID. The input device ID transmits corresponding driving state signals $DCS_{user}$ to the processor device CPU which uses these driving state signals $DCS_{user}$ to analyse corresponding tyre pressures for the purpose of identifying the tyres R1, . . . , R5.

The input device ID can also be used in vehicles which have the system SYS in combination with corresponding sensors S1, . . . , Sn. In this case, the input device ID is used as a diagnostic facility, for verification of the system SYS. It is possible in this case for the input device ID to be designed as a device located in the vehicle or as a portable diagnostic facility to be connected to the system SYS.

If a tyre change is performed following termination of an operation of the vehicle and prior to a re-startup of the vehicle, the data/information of the memory device MEM for identifying tyres can lose its validity. In order that valid data/information is always available for identification of the tyres during an operation of the vehicle, the identification of the tyres is repeated following each re-startup of the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Method for identifying a tyre of a vehicle, with the following steps:
    measurement of a tyre pressure of at least one vehicle tyre for at least two different driving-dynamic states of a vehicle,
    comparison of the tyre pressures, for the purpose of determining a tyre pressure variation, and
    analysis of the tyre pressure variation using driving state parameters which characterize the at least two different driving-dynamic states, for the purpose of identifying the vehicle tyre at which the tyre pressures were measured.

2. Method according to claim 1,
characterized in that
    the measurement and comparison of the tyre pressures are performed for at least one tyre of at least two different wheels of the vehicle.

3. Method according to claim 1,
characterized in that
    the measurement and comparison of the tyre pressures are performed for all tyres at which tyre pressures are determined, and the analysis of the tyre pressure variations is performed using information which comprises at least one of previously measured tyre pressures and tyre pressure variations.

4. Method according to claim 1,
characterized in that
the measurement of the tyre pressures comprises at least one measurement of the tyre pressures for a predetermined driving-dynamic state of the vehicle.

5. Method according to claim 1,
characterized by
measurement of driving state parameters which characterize the driving-dynamic states of the vehicle.

6. Method according to claim 5,
characterized by
determination of the driving-dynamic states of the vehicle from the driving state parameters.

7. Method according to claim 1,
characterized by
storage of data for the purpose of identifying the tyres.

8. Method according to claim 1,
characterized in that
the method is performed upon each re-startup of the vehicle.

9. Method according to claim 1,
characterized in that
the method is performed during a driving operation of the vehicle at predetermined instants or at predetermined intervals of time.

10. System for identifying a tyre of a vehicle, with:
a device which is located at a tyre of a vehicle for the purpose of measuring tyre pressures,
a transmitting device which is connected to the device for measuring the tyre pressures, for the purpose of transmitting tyre pressure signals,
a receiver device for receiving the tyre pressure signals transmitted by the transmitting device,
a processor device which is connected to the receiver device for the purpose of receiving the tyre pressure signals, and
at least one device for measuring driving state parameters which characterize the driving-dynamic states of the vehicle, the at least one device for measuring driving state parameters being connected to the processor device for the purpose of transmitting the driving state parameters,
characterized in that
the processor device is set up to determine, from the tyre pressure signals, tyre pressure variations for the tyres and to evaluate them using the driving state parameters for driving-dynamic states of the vehicle, for the purpose of identifying the tyre at which the device for measuring the tyre pressures is located.

11. System according to claim 10,
characterized in that
the device for measuring corresponding tyre pressures is one of a plurality of devices for measuring the pressure of a tyre, each of the devices for measuring the pressure of a tyre being respectively located at each of at least two tyres which are each respectively assigned to a wheel of the vehicle,
the transmitting device is one of a plurality of transmitting devices, and
each of the devices for measuring the tyre pressures is connected to a respective one of the transmitting devices, the receiver device being set up to receive tyre pressure signals of all transmitting devices.

12. System according to claim 11,
characterized in that
the processor device is set up to determine tyre pressure variations for each tyre at which one of the devices for measuring tyre pressures is located and to evaluate them, using the driving state parameters, for the purpose of assigning the tyre pressure variations to the respective tyre so that each tyre is identified.

13. System according to claim 10,
characterized in that
the device for measuring tyre pressures comprises a pressure sensor.

14. System according to claim 10,
characterized in that
the at least one device for measuring the driving state parameters comprises at least one sensor for measuring driving-dynamic state quantities.

15. System according to claim 10,
characterized in that
at least one of the devices for measuring tyre pressures and the transmitting device has a characteristic identification which is transmitted to the receiver device by the transmitting device at least one of before, after, and isochronously with the tyre pressure signals.

16. System according to claim 12,
characterized in that
the receiver device comprises receiving units which are respectively assigned to one or more of the transmitting devices for the purpose of receiving corresponding tyre pressure signals.

17. Method according to claim 3, characterized in that the analysis of the tyre pressure variations is performed using information which further comprises reference tables and information which is used for the application of at least one of neural networks and chaos theory methods.

* * * * *